United States Patent [19]
Bartusiak et al.

[11] Patent Number: 5,682,309
[45] Date of Patent: Oct. 28, 1997

[54] FEEDBACK METHOD FOR CONTROLLING NON-LINEAR PROCESSES

[75] Inventors: Raymond Donald Bartusiak; Robert William Fontaine, both of Houston, Tex.

[73] Assignee: Exxon Chemical Patents Inc., Wilmington, Del.

[21] Appl. No.: 431,244

[22] Filed: Apr. 28, 1995

[51] Int. Cl.$^6$ ................................................ G05B 13/04
[52] U.S. Cl. ...................... 364/149; 364/148; 364/157; 364/163; 364/164
[58] Field of Search ........................ 364/149, 150, 364/152, 156, 148; 366/157, 148, 149, 158, 567, 165, 164

[56] References Cited

U.S. PATENT DOCUMENTS

| | | | |
|---|---|---|---|
| 3,917,931 | 11/1975 | Sweeney, Jr. | 235/151.12 |
| 4,349,869 | 9/1982 | Prett et al. | 364/159 |
| 4,358,822 | 11/1982 | Sanchez | 364/151 |
| 4,578,747 | 3/1986 | Hideg et al. | 364/151 |
| 4,616,308 | 10/1986 | Morshedi et al. | 364/159 |
| 4,663,703 | 5/1987 | Axelby et al. | 364/149 |
| 4,748,448 | 5/1988 | Thompson | 342/26 |
| 5,038,269 | 8/1991 | Grimble et al. | 364/148 |
| 5,050,064 | 9/1991 | Mayhew | 364/172 |
| 5,057,992 | 10/1991 | Traiger | 364/148 |
| 5,099,412 | 3/1992 | Kelley | 364/148 |
| 5,119,468 | 6/1992 | Owens | 395/22 |
| 5,260,865 | 11/1993 | Beauford et al. | 364/151 |
| 5,268,834 | 12/1993 | Sanner et al. | 364/151 |

OTHER PUBLICATIONS

"A Constrained Nonlinear Multivariable Control Algorithm" *Institution of Chemical Engineers*, vol. 68, Part A, Sep. 1990.

"Multistep, Newton–Type Control Strategies For Constrained, Nonlinear Processes" *Chem Eng Res Des*, vol. 67, Nov. 1989, pp. 562–577.

"A Nonlinear DMC Algorithm And Its Application To A Semibatch Polymerization Reactor" *Chemical Engineering Science*, vol. 47, No. 4, pp. 737–753, 1992.

"Nonlinear Feedforward/Feedback Control Structures Designed By Reference System Synthesis" *Chemical Engineering Science*, vol. 44 No. 9, pp. 1837–1851, Great Britain.

"An Industrial Application Of Reference System Synthesis/Generic Model Control: Wastewater $_{pH\ Control}$", *Nonlinear Process Control: Application of Generic Model Control*, P.L. Lee Editor, Springer–Verlay, pp. 43–65, (1993).

Primary Examiner—Paul P. Gordon
Assistant Examiner—Ramesh Patel
Attorney, Agent, or Firm—Linda K. Russell

[57] ABSTRACT

A system controls a plant process which includes manipulated variables (e.g. input states) and control variables (e.g. output states). The system includes sensor circuitry for providing measures of the control variables and a memory for storing a correction time constant and upper and lower limits for at least one control variable. The upper and lower limits are separated by a band of values within which the one control variable is considered to be acceptable. A processor includes data describing a process model which relates costs of manipulated variables to control variables and, upon solution, further provides predicted values for the one control variable. Logic within the processor is responsive to a measured value function of the one control variable being outside the band of values, to determine minimum cost manipulated variables which result in a return of the predicted value of the one control variable to within the acceptable band of values. Control instrumentalities within the plant are operative to alter the manipulated variables (and input states) in accordance with signals from the processor.

4 Claims, 3 Drawing Sheets

FEEDBACK METHOD FOR CONTROLLING NON-LINEAR PROCESSES

FIELD OF THE INVENTION

This invention relates to process control systems and, more specifically, to a model-based feedback control system wherein non-linear relationships exist between plant manipulated variables and plant control variables.

BACKGROUND OF THE ART

U.S. Pat. No. 4,349,869 to Prett et al., entitled "Dynamic Matrix Control Method" describes a method and apparatus for controlling and optimizing operation of a series of interdependent processes in a plant environment. To accomplish control actions, input variables to the plant are subjected to measured perturbations and the dynamic effects on the outputs are noted to enable prediction of future response of the processes during on-line operation. To implement the control method, Prett et al. construct a table of values that are derived during the initial test phase. The various inputs and resulting outputs are incorporated into the table, which then serves as the principal reference point during subsequent plant operations.

The Prett et al. procedure is particularly adapted to control of linear system operations or operations which can be simulated as linear. When, however, a non-linear plant operation is encountered, the Prett et al. procedure does not perform adequately—especially when there are a multiplicity of control and manipulated variables. A control variable is a plant output which is affected by changes in one or more manipulated variables, e.g. inputs to the plant.

An application of the dynamic matrix control method to a polymerization process is described by Peterson et al. in "A Non-linear DMC Algorithm and its Application to a Semibatch Polymerization Reactor", Chem. Eng. Science, Vol. 47, No. 4, pp. 737–753 (1992). While Peterson et al. employ a non-linear controller and a numerical algorithm, for deriving solutions, their procedure does not attempt a minimization of input state costs in arriving at a control solution. Brown et al. in "A Constrained Nonlinear Multi-variable Control Algorithm" Trans I ChemE, Vol. 68(A), September 1990 pp, 464–476; describe a nonlinear controller which includes a specified level of acceptable output values within which control actions are inhibited. Brown et al., however, do not test for which input values achieve a minimum cost while also achieving output control.

The patent prior art includes many teachings of the use of model-based control systems employing both linear and non-linear expressions to relate control and manipulated variables. U.S. Pat. No. 4,663,703 to Axelby et al. describes a reference predictive model controller which employs an impulse model of a subsystem to simulate and predict future outputs. The system includes adjustable gain feedback and control loops which are adjusted to make the dynamic system appear to have constant characteristics, even when its dynamic characteristics are changing.

U.S. Pat. No. 5,260,865 to Beauford et al. describes a non-linear model-based control system for a distillation process which employs a non-linear model to calculate process vapor and distillate flow rates. Sanchez (4,358,822) describes an adaptive-predictive control system wherein a model determines a control vector to be applied to a process to cause a process output to be at a desired value at a future time instant. The parameters of the model are updated on a real time basis to cause the output vector to approach the actual process vector. U.S. Pat. No. 5,268,834 to Sanner et al. employs a neural network to configure a plant model for control purposes.

Extension of model-based control systems to plant operations is not a straight-forward problem when the plant operation comprises a dynamic, non-linear process and involves a multiplicity of manipulated and control variables. Until recently, process control computers of reasonable size and cost lacked the processing capability to handle solutions of the many simultaneous equations which resulted from the modeling of such dynamic plant processes.

Reference synthesis techniques have been developed for application to non-linear control problems (e.g. to pH control problems). In a reference system synthesis technique, it is desired to have a non-linear plant system follow a reference trajectory, and reach a set point according to a first or second order trajectory once the plant delay has expired. Bartusiak et al. in "Non-linear Feed Forward/Feedback Control Structures designed by Reference Systems Synthesis", *Chemical Engineering Science*, Vol. 44, No. 9, pages 1837–1851 (1989) describe a control process which can be applied to a highly non-linear plant operation. Fundamentally, Bartusiak et al. represent a plant to be controlled by a set of differential equations. The desired behavior of a closed loop control system is represented as a set of integro—differential equations which can be non-linear by design. The desired behavior is called the reference system.

Bartusiak et al. achieve desired closed-loop behavior results by adjusting manipulated variables so that the system behaves as nearly like the reference system as possible. The manipulated variable action is determined by equating or, in general, by minimizing the difference between the open loop system and the desired closed loop system. The desired behavior of the plant is then defined. Control variables are specified along with a tuning parameter which controls the rate at which the control variable reaches a set point. More specifically, the desired plant output parameter is set and the rate at which the control system reaches the desired output parameter in the control phase is dictated by the tuning parameter. Thus, the control function is driven to cause the output to reach the specified parameter value, irrespective of manipulated variable cost functions. The result does not take into account variations in manipulated variable costs which would enable not only effective plant operation control—but also a minimization of costs.

Accordingly, it is an object of this invention to provide an improved method for control of non-linear processes which enables tuning parameters to be applied to control variables.

It is another object of this invention to provide an improved method for controlling non-linear processes wherein the control methodology enables minimization of manipulated variable input costs while simultaneously achieving desired control variables.

SUMMARY OF THE INVENTION

A system controls a plant process which includes manipulated variables (e.g. input states) and control variables (e.g. output states). The system includes sensor circuitry for providing measures of the control variables and a memory for storing a correction time constant and upper and lower limits for at least one control variable. The upper and lower limits are separated by a band of values within which the one control variable is considered to be acceptable. A processor includes data describing a process model which relates costs of manipulated variables to control variables and, upon solution, further provides predicted values for the one control variable. Logic within the processor is responsive to a measured value function of the one control variable being outside the band of values, to determine minimum cost manipulated variables which result in a return of the predicted value of the one control variable to within the acceptable band of values. Control instrumentalities within the plant are operative to alter the manipulated variables (and input states) in accordance with signals from the processor.

DETAILED DESCRIPTION OF THE INVENTION

Hereafter, the following terms will be employed in the description of the invention:

Process Model: A process model defines plant system operation and is formulated in a continuous time domain in the form of algebraic and differential equations.

Discretization of Manipulated Variables: Manipulated moves are discrete time variables. A zero-order hold function is employed to provide discrete manipulated move variables for use in the process model.

Reference Trajectory: A reference trajectory provides the specification of a controller performance as a rate of response of control variables.

Objective Function: An objective function defines an optimum control performance. The objective function includes penalties for violation of control setpoints and economic cost (profit) functions.

Manipulated Variable Limits: Manipulated variable limits are set to reflect secondary controller limits or status such as range limits, set point limits and anti wind-up conditions.

Feedback: Feedback is incorporated in the reference trajectory as a bias value which represents an error between process measurements and model predictions.

State Estimation: Predictions for process model states and outputs are provided at each controller scan by integration of the dynamic model, based on current values from manipulated and feed forward variables and the predictions derived during a previous controller scan time.

Initialization: Initialization of controller outputs is provided by reading of current manipulated variable values at each scan and providing controller moves as increments to the values. When the controller program is running (either closed loop or open loop), the model states and outputs are initialized at values predicted during a previous controller scan. When the program is first turned on, model states and outputs are initialized by solving a steady state model for the current manipulated and feed forward values.

Figure 1:
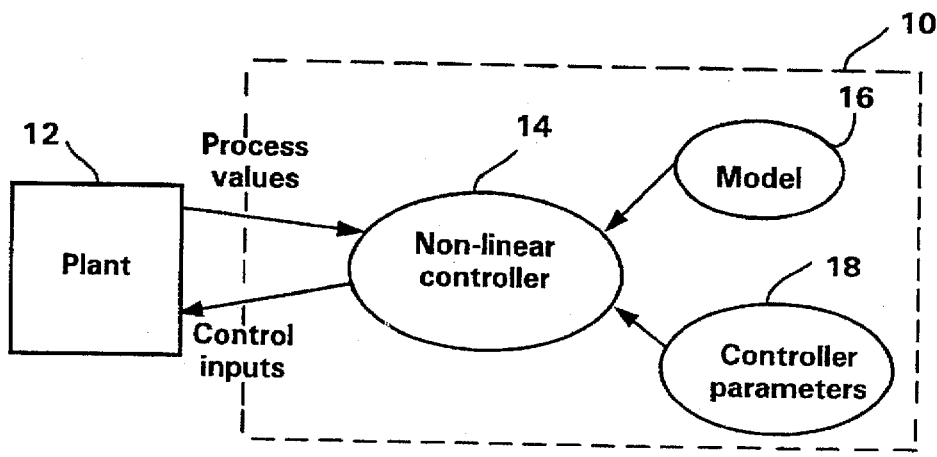
FIG. 1 is a block diagram of a system that incorporates the invention.

Turning to FIG. 1, a digital computer-based control system monitors a process occurring in plant 12. Process values are fed to a non-linear controller function 14 resident within the digital control system 10. A process model 16 is stored within digital control system 10 and manifests a series of non-linear equations which provide a reference system for non-linear controller 14. A plurality of control parameters 18 provide constraints for control values derived by non-linear controller 14. By comparison of process value measurements with predicted values derived through a solution model 16 (with control parameters 18), correction values are derived and applied as control inputs to plant 12.

Figure 2:
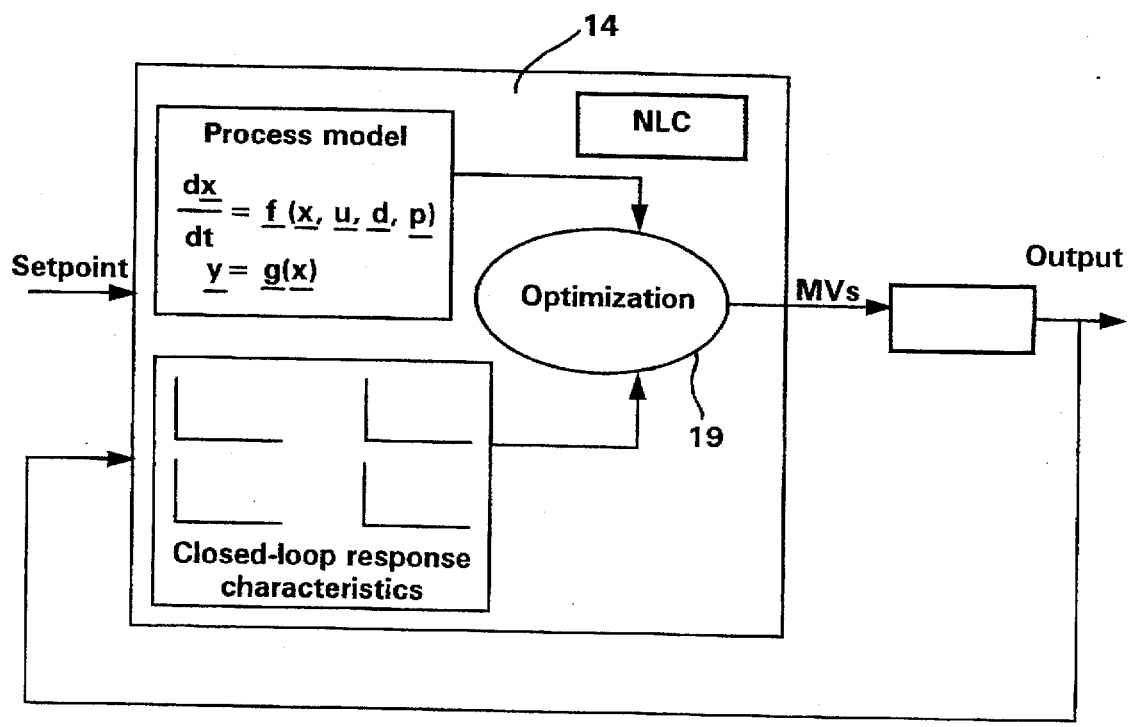
FIG. 2 is a schematic of control functions employed in the invention.

In FIG. 2, non-linear controller 14 include dynamic process model 16 which defines a rate change of process states for changes in system manipulated variables, independent variables, and bias values. Non-linear controller 14 further includes one or more tuning values which define closed loop process response characteristics. More specifically, each process response characteristic defines a trajectory to be followed by a control variable in response to changes in manipulated variables. An optimization function 19 determines minimized manipulated variable costs which achieve the desired response trajectory, given differences between measured values and predicted values derived from process module 16.

It will hereafter be understood that non-linear controller 14 establishes limit boundaries for one or more control variables (e.g. outputs) from plant 12. Once the upper and lower limits for a control variable are established, non-linear controller 14 implements a control procedure that compares a measured rate of change between a control variable and a rate of desired movement of the control variable in relation to at least one of the limits. If the control variable is within the upper and lower limits, no control action is taken. If the control variable is outside the limits, comparison of the measured dynamic rate of change and the model dynamic rate of change enables derivation of an error rate of change value. That error rate of change value is then employed by an objective function to enable determination of a set of manipulated variables that will exhibit a least cost to obtain a return of the control variable to within the upper and lower limits. By utilizing the upper and lower limits to define an acceptable range of control variable values, various manipulated variable costs can be tested to determine which combination allows for a return of the control variable to within the limits while, at the same time, minimizing manipulated variable costs.

Figure 3:
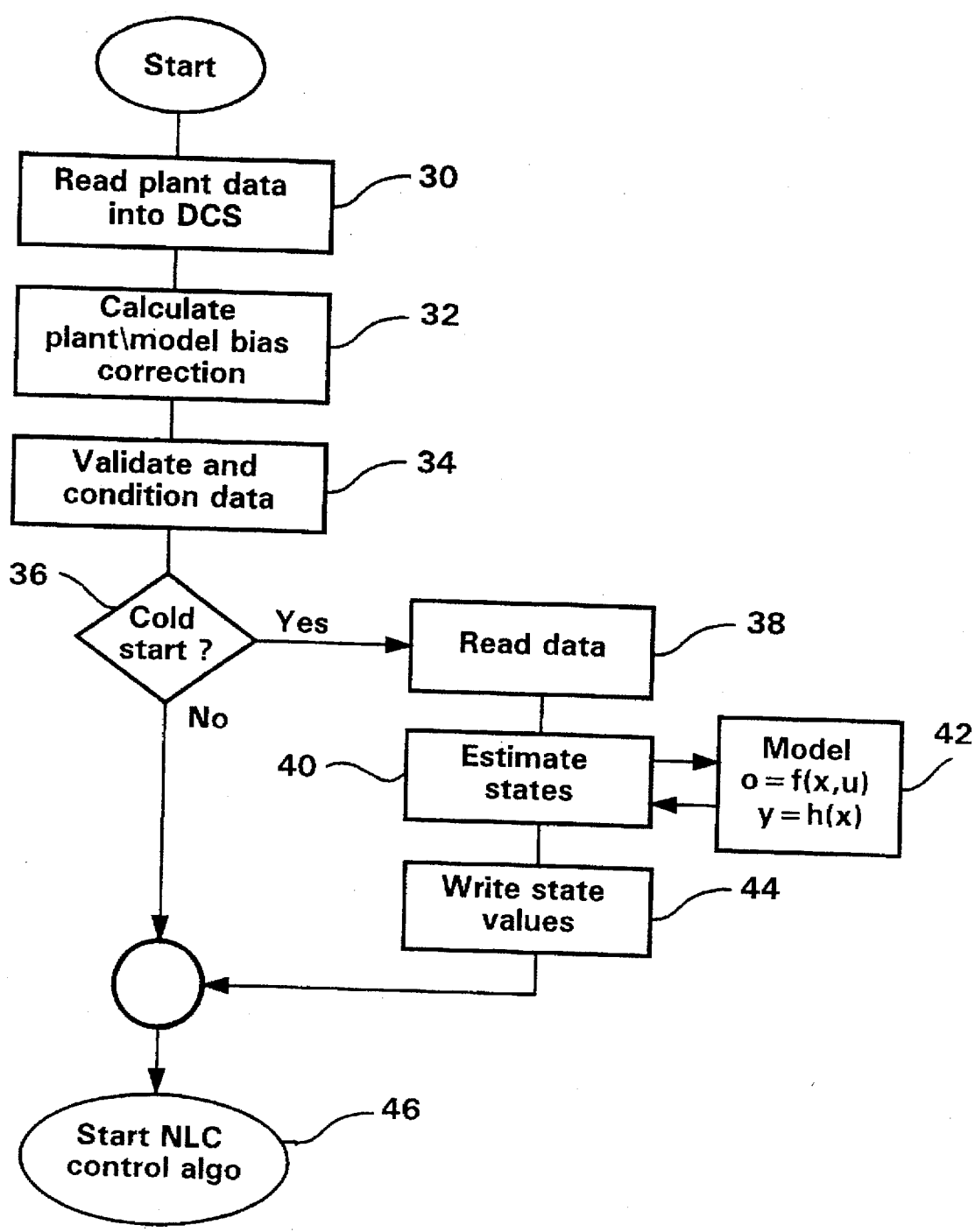
FIGS. 3 and 4 are flow diagrams useful in understanding the operation of the invention.
Figure 4:
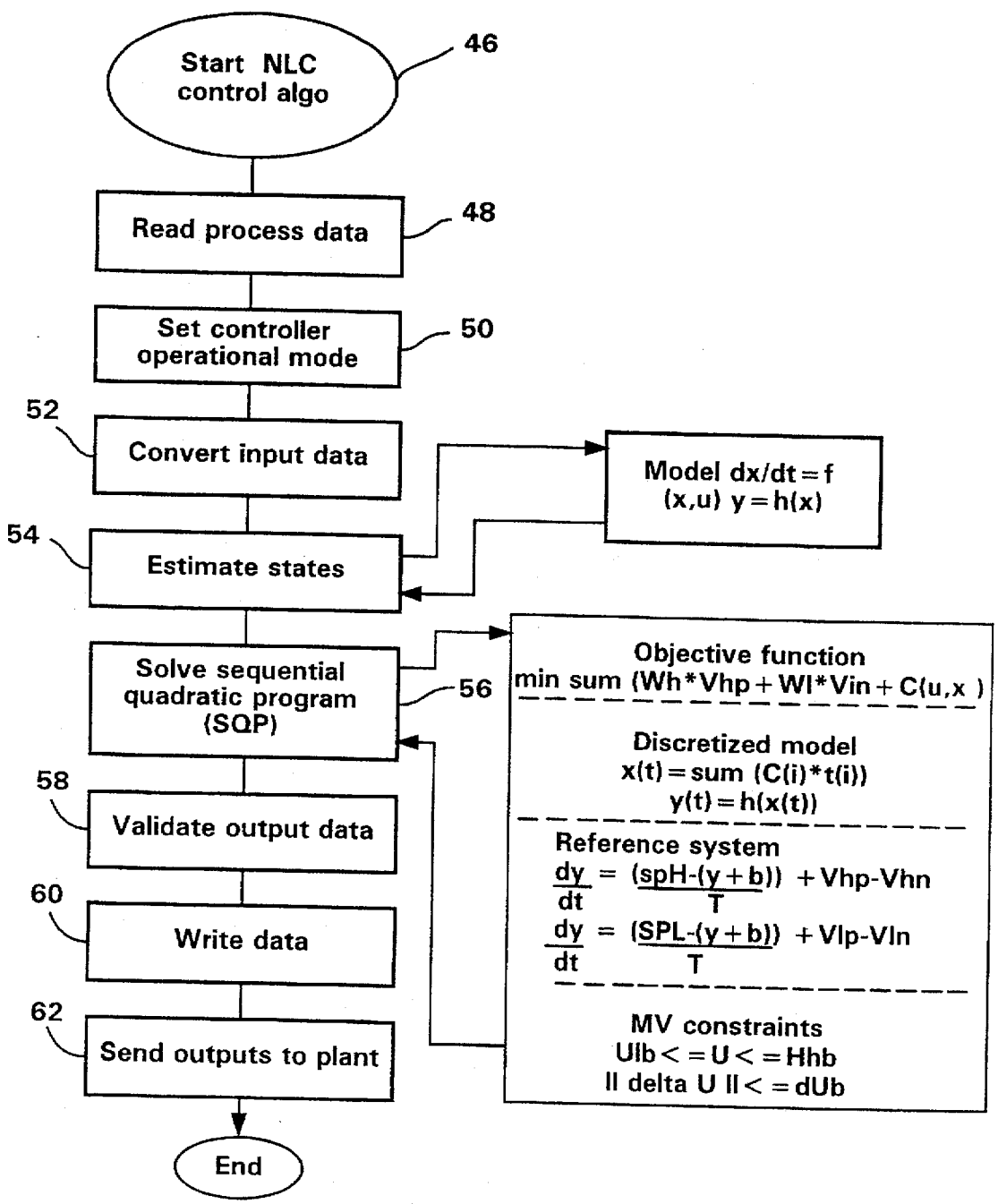

Turning to FIGS. 3 and 4, a description of the operation of non-linear controller 14 will be presented. Non-linear controller 14 runs on a general purpose computer that is integrated with plant 12. Non-linear controller 14 runs at a specified frequency or scan rate, for example, once per minute whereby control variables are monitored and manipulated variables are calculated so as to derive moves for each to implement a control action.

The procedure commences by reading plant data into digital control system 10 (box 30). Those data include current values for the control variables, manipulated variables and auxiliary or feed forward variables. Plant measurements are supplied by either field instruments or via off-line laboratory analyses. Next, current measurement values of each control variable are compared with a corresponding model prediction. A bias value representing the plant/model mismatch is calculated as the difference between the measurements and predicted values (box 32).

As shown in box 34, the input data is next validated (e.g., abnormal conditions such as unavailable measurement values or values out of range are discarded). Data conditioning is also performed and includes filtering and setting of manipulated variable bounds, based on operator specified limits and plant control system status values.

At the commencement of operation of non-linear controller 14, a cold start initialization is performed (see decision box 36). The values for the independent variables, either manipulated or feed-forward, are read from a database stored within the digital control system 10 (box 38). An initialization action calculates the model states and plant outputs which represent plant conditions such as temperature, composition and product properties. The model may be in any mathematical form.

A state-space model will be used hereafter for purposes of description of the procedure. Each state is defined by an "x" vector value and plant outputs are represented by "y" vector values. Independent variables are represented by the value "u" as follows:

$$0 = F(x, u) \tag{1}$$

$$y = H(x) \tag{2}$$

The values for the plant states are then used as initial values for non-linear controller 14 (see boxes 40 and 42). The state values are then estimated and written to memory (box 44). At this point, non-linear controller 14 commences operation of the process control algorithm (box 46).

As shown in FIG. 4, the control process reads process data from plant control system hardware (box 48) to determine the present state of the process. That data includes the following:

Initial values for each model state.

Initial values for predicted plant outputs.

Bias values representing plant/model errors.

Model parameters.

Current measured values of independent variables.

Set points or target values for control variables and constraints.

Bounds for manipulated variables.

Input status conditions.

Values for the model states and predicted plant outputs are either the previous values from a last controller run or from the cold start initialization values. The control variable(s) (e.g., an output to be controlled) and constraint set points are entered by the operator. The set points are entered as an upper limit value and a lower limit value. Use of these values enables adjustment of manipulated variables (inputs) so as to achieve a minimized cost in arriving at a control variable value within the upper and lower limit values. The model parameter values are predetermined. Current measured values of independent variables are derived from plant field instruments or laboratory analyses. Manipulated variable bounds are, as indicated above, based on operator specified limits and plant control system status values.

The controller operational mode is then set (box 50). One controller mode enables model predictions to be calculated and control signals derived, without a applying the control signals to the plant. Hereafter, it will be assumed that the digital control system is set in a fully operational mode, wherein manipulated variables are to be actively controlled in accordance with model calculations and measured system states.

The input data is converted into a form for use with the model/control system (box 52) and a state estimation procedure is commenced (box 54). Each state is estimated using a dynamic model of the plant. In the state/space model shown below in equations 3 and 4, the states are represented by the "x" variable, the plant outputs are represented by the "y" variable and independent variables are represented by "u".

$$dx/dt = F(x, u) \tag{3}$$

$$y = H(x) \tag{4}$$

Equation 3 indicates that the rate of change of the model states is a function of the model states, themselves and the independent variables. Equation 4 indicates that the output is a function of the model states. Model estimates are obtained by integration of equations 3 and 4 from the last run of non-linear controller 14 to the current time. A preferred calculation method involves orthogonal collocation wherein equations 3 and 4 are divided into time segments, thereby enabling the differential equations to be solved in parallel, over a same time increment.

The control calculations performed by non-linear controller 14 are performed by employing sequential quadratic programming techniques (box 56). The control calculation determines future moves in manipulated variables which give a best match to the control performance specification over a time horizon into the future. Non-linear controller 14 utilizes the. model of the plant, a reference trajectory defining specified controller performance, an objective function (to be described below) and the manipulated variable bounds. Manipulated variable moves are discretized over a time horizon into the future.

The model shown in equations 3 and 4 is utilized. As above indicated, the "u" variable represents independent variables and a subset thereof are the manipulated variables (i.e. inputs). Values for all independent variables are obtained by a "zero-order hold function" of discretized manipulated variables $U_k$ at each time step k. A zero-order hold function assumes that the value of the manipulated variable remains constant between program executions.

The reference trajectory specifies controller performance in altering control variables in accordance with applied constraints. Reference trajectory equations 5 and 6 below express a relationship between rates of change of the control variables and the error (or difference) between a control variable set point and the measured controlled variable.

$$dy_k/dt = (SPH_k - (y_k + b))/T + Vhp_k - Vhn_k \tag{5}$$

$$dt_k/dt = (SPL_k - (y_k + b))/T + Vlp_k Vln_k \tag{6}$$

k=1 to K

Vlp>=0.0

Vln>=0.0

Vhp>=0.0

Vhn>=0.0

Where:

SPH=upper limit for control variable or constraint;

SPL=lower limit for control variable or constraint;

y=predicted control variable;

b=bias relating error in prediction and measurement;

Vhp=positive variation of measured variable from SPH;

Vhn=negative variation of measured variable from SPH;

Vlp=positive variation of measured variable from SPL;

Vln=negative variation of measured variable from SPL;

k=time step into the future;

K=time steps into the future in the time horizon used by the controller;

T=time constant for desired closed loop speed of response of the controlled variable.

Each of variables Vlp, Vhp, Vln, and Vhn will hereafter be termed "violation" variables. Each violation variable allows an inequality to be converted to an equality relationship and allows prioritization of constraints through application of weighting functions in the objective function. The objective function (i.e. the relationship to be satisfied by the control action) is given by:

$$\text{Min Sum } (Wh*Vhp_k + Wl*Vln_k) + C(xu) \quad (7)$$

Where:

Wh, Wl=Penalty weights;

$Vhp_k$, $Vlp_k$=Violation variables defined above;

C(x,u)=Cost penalty function.

Equation 7 expresses a sum minimization function for use when a violation has occurred of either the upper limit of the control variable or the lower limit of the control variable. Equation 7 applies weighting factors which enable either a positive violation value or a negative violation value to be emphasized (or deemphasized), as the case may be. Equation 7 also includes a term (i.e. C(x,u)), which is a cost function that is dependent upon both manipulated variable u and model states x.

The control system solves equation 7 and evaluates a sum resulting from each solution when plural changes in manipulated variables are attempted. The objective is to achieve a return of the control variable y to within the bounds defined by the upper limit (SPH) and the lower limit (SPL). As SPH and SPL are separated by a span of values defining an acceptable range of the control variable, a number of possible changes in manipulated variables can be calculated to determine which combination results in a lowest cost for the manipulated variables while achieving a return of the control variable to the acceptable range. When the manipulated variables (in any control action) enable a return of plant output to within the span between SPH and SPL, each of the first two expressions in equation 7 are nulled and the solution of the function is strictly related to the costs represented by the manipulated variables.

The optimization solution of equation 7 is subject to additional manipulated variable bounds as expressed below in equations 8 and 9.

$$ulb < u_k < uhp \quad (8)$$

$$ABS(u_k - u(_k-1)) < dub \quad (9)$$

Where:

uhb=upper bound on a manipulated variable;

ulb=lower bound on a manipulated variable;

dub=bound on change in u between time steps.

Once an acceptable solution has been achieved, the outputs, consisting of manipulated variable values for each time step in the future, are checked against system constraints (box 58). Assuming validity of the output data, the data is then written to memory (box 60) and the calculated manipulated values are sent to the plant (box 62) to operate field control elements (e.g., valves).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for controlling a plant process including manipulated variables comprising input states, and control variables comprising output states, said system comprising;

sensor means for providing measures of at least said control variables;

memory means for storing upper and lower limits and a correction time constant for at least one control variable, said upper and lower limits separated by a band of values within which said at least one control variable is considered acceptable, said correction time constant prescribing a rate of return of said one control value to within said band of values;

processor means coupled to said sensor means and said memory means and including data describing a model of said plant process, said model relating costs of manipulated variables to control variables and, upon solution, further providing predicted values for said at least one said control variable, said processor means further including logic means responsive to a measured value function of said at least one control variable being outside of said band of values, to generate control signals to alter said manipulated variables in a direction to achieve a minimized cost thereof, said manipulated variables being altered at a rate in accordance with said correction time constant and in a direction to cause a predicted value of said at least one control variable to be within said band of values; and control signal means responsive to said control signals for operating instrumentalities in said plant to control said manipulated variables.

2. The system for controlling a plant process as recited in claim 1, wherein said memory means further stores data describing a trajectory response function for said model which prescribes a rate of return for said one control variable to said band of values considered acceptable when said upper limit is breached by said control variable, and a trajectory response function for said model which prescribes a rate of return for said one control variable to said band of values considered acceptable when said lower limit is breached by said at least one control variable, both trajectory response functions including correction time constants and expressing a relationship between measured and desired rates of change of said at least one control variable, said logic means employing said data to determine said minimized cost input states.

3. The system for controlling a plant process a recited in claim 2, wherein said trajectory response functions for said at least one control variable are:

$$dY_k/dt = (SPH_k - (Y_k+b))/T + Vhp_k - Vhn_k$$

$$dY_k/dt = (SPL_k - (Y_k+b))/T + Vlp_k - Vln_k$$

k=1 to K

Vlp>=0.0

Vln>=0.0

Vhp>=0.0

Vhn>=0.0 where:

SPH=upper limit for control variable or constraint;

SPL=lower limit for control variable or constraint;

y=predicted control variable;

b=bias relating error in prediction and measurement;

Vhp=positive variation of measured variable from SPH;

Vhn=negative variation of measured variable from SPH;

Vlp=positive variation of measured variable from SPL;

Vln=negative variation of measured variable from SPL;

k=time step into the future; and

K=time steps into the future in the time horizon used by the controller;

T=time constant for desired closed loop speed of response of the controlled variable.

4. The system for controlling a plant processor as recited in claim 3, wherein said logic means operates to provide a solution to a minimization relationship in order to determine minimized cost manipulated variables for achieving a movement of said at least one control variable to within said band of values, said minimization relationship expressed as:

$$\text{Min Sum } (Wh*Vhp_k + Wl*Vln_k) + C(x,u) \tag{7}$$

where:

Wh, Wl = Penalty weights;

$Vhp_k$, $Vlp_k$ = Violation variables;

$C(x,u)$ = Cost penalty function.

* * * * *